Patented Aug. 13, 1935

2,010,829

UNITED STATES PATENT OFFICE 2,010,829

PRODUCTION OF MIXED ORGANIC ESTERS OF CELLULOSE

Cyril J. Staud and Charles L. Fletcher, Rochester, N. Y., assignors to Eastman Kodak Company, Rochester, N. Y., a corporation of New York No Drawing. Application September 5, 1931, Serial No. 561,510

4 Claims. (Cl. 260—101)

The present invention relates to the production of the organic mixed esters of cellulose, such as cellulose acetate-stearate, in which diluents such as methylene chloride, ethylene chloride, propylene chloride, chlorethyl acetate or 1.4-dioxan are employed.

It has been previously known to produce simple esters of cellulose by treating the cellulose with an acid chloride in an esterification bath containing a diluent such as chloroform, carbon tetrachloride, benzene or toluene to produce a fibrous cellulose ester. It has also been known to employ some of these diluents in the esterification of cellulose in the presence of pyridine, but the products formed by this process are of little commercial importance.

It has been known to produce mixed esters of cellulose in esterifying baths in which acetic and/or chloracetic acids have been employed as solvents, but due to their acidic nature they are corrosive and must be cautiously handled. When chloracetic acid for example is used alone as a solvent in an esterification bath the damage to equipment is severe. Also in instances where a low content of acetic acid is desired in the finished ester or where a cellulose acetate is the initial cellulose material employed, little, if any, acetic acid is desired in the esterification bath. Consequently the substitution of a suitable inert material for a large part or where practicable, all of the chloracetic or acetic acid which might be employed as the solvent in an esterification bath is desirable. Also solvents which are insoluble in water and yet will form an azeotropic distillation mixture therewith as is characteristic of methylene chloride, ethylene chloride or propylene chloride are especially valuable in this connection. For example, if an anhydrous reaction mixture is desired in which ethylene chloride is employed, some of the ethylene chloride may be driven off by heating and thereby carry off in its vapors the moisture contained in the reaction bath. The value of a solvent which is insoluble in water is illustrated by its separation when the reaction mixture containing that solvent has been poured into an aqueous precipitation bath to separate out the cellulose derivative. The water-insoluble solvent may be separated from the aqueous bath merely by separating the aqueous and nonaqueous layers, for instance by decantation.

We have found that by our invention the recovery of the various components of the precipitating liquid, after a cellulose derivative reaction mixture has been introduced, is facilitated. We have found that by our invention the cellulose derivative product formed is in a loose and porous condition so that it may be easily transformed, for example by solvents, as desired by the individual. We have found that in our invention the solvents employed are inert to the reagents commonly employed and are not broken up into harmful materials, such as hydrochloric acid by reagents such as chloracetic anhydrid, as some organic chlorides are prone to do.

We have found that our invention is particularly applicable to the production of the mixed esters of cellulose containing higher organic acid radicals such as, for example, those described in U. S. Patent No. 1,704,282 to Clarke and Malm, either from cellulose or a partially esterified cellulose acetate as the starting material. We have found that by our invention the amount of acid radicals, for instance acetyl, may be regulated by employing a solvent that does not take part in the esterification reaction instead of acetic acid thereby making possible the production of a low acetyl mixed ester. Conversely if the substitution of the acetic acid by an inert solvent (inert with respect to the reagents) is limited, a mixed ester having a larger acetyl content will be produced.

We have found that methylene chloride, ethylene chloride, or propylene chloride, or solvents such as 1.4-dioxan and chlorethyl acetate are valuable in reaction baths for the production of the mixed organic esters of cellulose. We have found that these solvents are especially valuable as solvents in esterification baths to produce mixed esters such as for example cellulose acetate-stearate, cellulose acetate-laurate, cellulose propionate-stearate, cellulose acetate-stearate-palmitate, cellulose acetate-oleate, cellulose butyrate-margarate, cellulose acetate-pelargonate, cellulose acetate-propionate-stearate, and similar esters.

The following examples illustrate the application of our invention to the production of mixed esters of cellulose from a partially esterified cellulose ester (either incompletely esterified cellulose or fully esterified from a partially esterified cellulose or fully esterified cellulose which has been partially hydrolyzed) and from cellulose as the starting material.

Example I 10 kilograms of a hydrolyzed cellulose acetate having an acetyl content of approximately 36% was dissolved in 10 k. g. of monochloracetic acid and 30 liters of propylene chloride with gentle warming. The solution was then cooled to about 80° F. 20 k. g. of stearic acid was dissolved with warming to 120–180° F. in 10 k. g. of chloracetic anhydride, the solution formed was cooled to about 105° F. and added to the solution of cellulose acetate in chloracetic acid and propylene chloride. The mass was then heated from 80° F. to 130° F. over a period of 8 hours, was then cooled to 80° F. and the ester formed was precipitated from solution by the method disclosed in Malm and Fordyce application Serial No. 553,646 filed July 28, 1931, according to which method the reaction mass is diluted with half its volume of isopropyl ether and the mixture is then poured into iso-propyl ether accompanied by agitation. The resulting product was a cellulose acetate stearate.

*Example II*

The ingredients and proportions of the preceding example were employed except that 30 liters of 1.4-dioxan was employed in place of the corresponding amount of propylene chloride.

The mass was heated from 80° F. to 130° F. over a period of 10 hours instead of 8 hours as in the preceding example. The ester formed was precipitated by means of iso-propyl ether by the same procedure as employed in the preceding example. A cellulose acetate - stearate was formed which was characterized by exceptionally high viscosity and freedom from grain.

*Example III*

500 lbs. of purified and bleached cotton fibers were treated at a slightly elevated temperature (for instance 70°–100° F.) for about 4 hours with 3000 lbs. of glacial acetic acid containing about 15 lbs. of sulfuric acid. The cotton was then pressed or centrifuged to remove the greater portion of the acetic acid. To this mixture of cellulose, acetic acid and sulfuric acid, 4000 lbs. of lauric acid, 1000 lbs. of chloracetic anhydride and 2000–3000 lbs. of ethylene chloride was added and the treatment was carried on for 8 hours at 90°–130° F. or until a clear flowable dope was obtained. A cellulose acetate-laurate with a high lauryl content was obtained, the chloracetic anhydride impelling into the cellulose both acetyl and lauryl radicals. The ester was separated from its reaction mass by diluting the mass with 50% of its volume of iso-propyl ether and then pouring the whole into a bath of iso-propyl ether accompanied by stirring.

The precipitated products formed according to our invention are loose, fluffy and porous and have a large surface in proportion to the mass or weight of the material. As a consequence the material is readily susceptible to dissolution by an appropriate solvent which solution may be employed for the production of films or thin tissues of the ester in colloidized form.

The solutions of the mixed esters produced by our process may be employed for the production of artificial silk by forcing the solution through an orifice into a precipitating bath such as a current of heated air or a precipitating liquid.

Although the partially esterified cellulose derivatives prescribed in the examples are the cellulose acetates, other partially esterified cellulose formates, cellulose nitrates, mixed esters such as hydrolyzed cellulose acetate-propionates or cellulose acetate-butyrates or partially esterified cellulose ethers may be employed as the starting material in processes carried out according to our invention. Also instead of cotton linters others suitable cellulose-containing materials such as regenerated cellulose, sulfite wood pulp, purified bagasse pulp, etc. may be employed to produce mixed organic esters of cellulose according to the process of our invention.

Various liquids may be employed as the solvents for the mixed esters produced by our process the criterion being merely the solubility of the ester in the particular solvent. For example the cellulose esters having for every 24 carbon atoms in the cellulose, less than 4 (but at least one-third of one) acyl groups selected from the higher fatty acids having more than 8 carbon atoms, are soluble in acetone; consequently acetone may be employed in the making of products from esters of that type. On the other hand mixed esters of cellulose in which there are more than 4 of the higher acyl groups per every 24 carbon atoms in the cellulose are insoluble in acetone and soluble in benzol, consequently benzol could be employed as a solvent for those esters, in the production of colloidized products therefrom.

Our process may be employed for various esterification processes, in which the mixed organic esters of cellulose containing an acyl radical of more than 8 carbon atoms are produced, whether there is employed in the bath an acid anhydride which contributes acyl groups to the ester, such as acetic anhydride, an acid anhydride which impels acyl groups into the cellulose molecule but which does not contribute any acyl groups, such as chloracetic or an alkoxyacetic anhydride, or an acyl chloride.

The catalysts which are usually employed in the esterification of cellulose such as sulfuric acid, magnesium perchlorate, etc., may be employed in the carrying out of our invention or the catalyst may be present as an impurity in one or more of the reagents especially when the technical grade is employed so that addition of a catalyst would be unnecessary altho probably desirable. Also various temperatures up to the boiling point of the ethylene chloride may be employed in our esterification process and they will usually be found suitable, however if still higher temperatures are employed the esterification chamber obviously may be fitted with a refluxing device to condense the ethylene chloride vapors formed, at the higher temperature, and return them to the bath.

Our process is adapted to be employed over a wide range of proportions of the reagents employed in the esterification bath. Also the proportions of the solvents, which we employ in our esterification process, may be varied within wide limits without departing from the scope of our invention.

Various modifications of our process not disclosed herein but obvious to anyone skilled in the production of cellulose derivatives are also within the contemplation of the present invention.

We claim as our invention:

1. The process of preparing a mixed fatty acid ester of cellulose containing a fatty acid of more than 8 carbon atoms which comprises acylating cellulosic material in the presence of a solvent selected from the group consisting of methylene chloride, ethylene chloride, propylene chloride, chlorethyl acetate and 1—4 dioxan.

2. The process of preparing a mixed fatty acid ester of cellulose containing a fatty acid group of more than 8 carbon atoms which comprises acylating a cellulose ester containing free and esterifiable hydroxyl groups in the presence of a solvent selected from the group consisting of methylene chloride, ethylene chloride, propylene chloride, chlorethyl acetate and 1—4 dioxan.

3. The process of preparing a mixed fatty acid ester of cellulose containing stearyl groups which comprises stearylating a cellulose ester containing free and esterifiable hydroxyl groups in the presence of a solvent selected from the group consisting of methylene chloride, ethylene chloride, propylene chloride, chlorethyl acetate and 1—4 dioxan.

4. The process of preparing cellulose acetate stearate which comprises stearylating cellulose acetate containing free and esterifiable hydroxyl groups in the presence of ethylene chloride.

CYRIL J. STAUD.
CHARLES L. FLETCHER.